(12) United States Patent
Iwashima

(10) Patent No.: US 9,182,718 B2
(45) Date of Patent: Nov. 10, 2015

(54) IMAGE FORMING APPARATUS

(75) Inventor: Yasuhiro Iwashima, Itami (JP)

(73) Assignee: KYOCERA DOCUMENT SOLUTIONS INC. (JP)

( * ) Notice: Subject to any disclaimer, the term of this patent is extended or adjusted under 35 U.S.C. 154(b) by 481 days.

(21) Appl. No.: 12/505,689

(22) Filed: Jul. 20, 2009

(65) Prior Publication Data
US 2010/0021197 A1    Jan. 28, 2010

(30) Foreign Application Priority Data
Jul. 22, 2008    (JP) ................. 2008-188685

(51) Int. Cl.
G03G 15/00    (2006.01)
G03G 15/20    (2006.01)
H04N 1/00    (2006.01)

(52) U.S. Cl.
CPC .......... G03G 15/5004 (2013.01); G03G 15/205 (2013.01); H04N 1/00519 (2013.01); H04N 1/00551 (2013.01); H04N 1/00885 (2013.01); H04N 1/00891 (2013.01)

(58) Field of Classification Search
CPC .................. G03G 15/205; G03G 15/5004
USPC .......................................................... 399/75
See application file for complete search history.

(56) References Cited

U.S. PATENT DOCUMENTS 4,745,436 A * 5/1988 Matsuura ................... 399/70
5,253,015 A * 10/1993 Morita et al. ............... 399/13
6,577,825 B1 * 6/2003 Gonnella, Jr. et al. ......... 399/38
7,567,356 B2 * 7/2009 Endo ......................... 358/1.14
2005/0278557 A1   12/2005 Asoh et al. ................. 713/300

FOREIGN PATENT DOCUMENTS

| CN | 1707399 A | 12/2005 |
|---|---|---|
| JP | 4-69673 | 3/1992 |
| JP | 5-313436 | 11/1993 |
| JP | 2000-358128 | 12/2000 |
| JP | 2002-77482 | 3/2002 |
| JP | 2002-281191 | 9/2002 |
| JP | 2004-328171 | 11/2004 |
| JP | 2005-111818 | 4/2005 |
| JP | 2006-65146 | 3/2006 |
| JP | 2008040425 A * | 2/2008 |

OTHER PUBLICATIONS

Office Action dated Jun. 5, 2012 issued in corresponding Japanese Patent Application No. 2008-188685 (not submitted herewith).

* cited by examiner

*Primary Examiner* — David Gray
*Assistant Examiner* — Andrew V Do
(74) *Attorney, Agent, or Firm* — Ostrolenk Faber LLP

(57) ABSTRACT

An image forming apparatus capable of toggling between image formation mode and energy conservation mode, the image formation mode allowing image formation on a recording medium, and the energy conservation mode having power consumption lower than that of the image formation mode, the image forming apparatus including: a constantly-energized portion that is energized both in the image formation mode and the energy conservation mode; a non-constantly-energized portion that is energized only in the image formation mode; and an opening/closing member capable of exposing an internal mechanism held inside a casing of the image forming apparatus, in which the constantly-energized portion toggles from the energy conservation mode to image formation mode when the opening/closing member is closed from an opened state in the energy conservation mode.

2 Claims, 4 Drawing Sheets

IMAGE FORMING APPARATUS

Priority is claimed on Japanese Patent Application No. 2008-188685, filed on Jul. 22, 2008, the contents of which are incorporated herein by reference.

BACKGROUND OF THE INVENTION

1. Field of the Invention

The present invention relates to an image forming apparatus.

2. Description of the Related Art

Conventionally, image forming apparatuses such as printers and facsimile apparatuses have an energy conservation mode for achieving energy conservation. In energy conservation mode, energization of a unit or the like for forming an image is stopped in a standby state where image formation is not performed on a recording medium such as a printer sheet. Image forming apparatuses with such energy conservation mode are capable of reducing power consumption when image formation is not performed (that is, in standby mode).

For the energy conservation mode to be toggled to the image formation mode that allows image formation, it is required that a return instruction be received from the user.

For this reason, there is proposed a method in which an operation of opening a cassette with a holder portion for holding printer sheets is considered as a return instruction, on the precondition that printing is performed after restocking printer sheets (recording media).

According to the above-mentioned image forming apparatus, the energy conservation mode is toggled to the image formation mode when it is detected that an opening/closing member capable of exposing an internal mechanism of the image forming apparatus has been opened. This can improve the operability of the image forming apparatus.

However, if the opening/closing member is opened to expose the internal mechanism of the image forming apparatus, the user typically does some kind of work. That is, if the opening/closing member is the aforementioned cassette, the user restocks printer sheets. As a result, printing is not performed for a while after the opening/closing member is opened.

Therefore, if the operation of opening the opening/closing member is taken as a return instruction, image formation will not be performed for a while after the energy conservation mode is toggled to the image formation mode. This results in a wasteful consumption of power.

SUMMARY OF THE INVENTION

The present invention has been achieved in view of the aforementioned problem, and has an object to provide an image forming apparatus capable of further reducing power consumption.

In order to solve the above problem, the present invention employs the following.

That is, an image forming apparatus according to an aspect of the present invention is an image forming apparatus capable of toggling between image formation mode and energy conservation mode, the image formation mode allowing image formation on a recording medium, and the energy conservation mode having power consumption lower than that of the image formation mode, the image forming apparatus including: a constantly-energized portion that is energized both in the image formation mode and the energy conservation mode; a non-constantly-energized portion that is energized only in the image formation mode; and an opening/closing member capable of exposing an internal mechanism held inside a casing of the image forming apparatus, in which the image forming apparatus toggles from the energy conservation mode to image formation mode when the opening/closing member is closed from an opened state in the energy conservation mode.

According to the above image forming apparatus, when the opening/closing member is closed from an open state, energy conservation mode is toggled to image formation mode.

As a result, it is possible to reduce the amount of time when the image formation device is in image formation mode compared with the case of an image forming apparatus where when the opening/closing member is opened, the energy conservation mode is toggled to the image formation mode.

Therefore, according to the above-mentioned image forming apparatus, it is possible to further reduce power consumption in the image forming apparatus.

Additional objects of the present invention and specific advantages obtained by the present invention will be further revealed by the following description of embodiments.

DETAILED DESCRIPTION OF THE INVENTION

Hereunder is a description of embodiments of image forming apparatuses according to the present invention. In the following drawings, scale ratios among the constituent elements are appropriately modified to make sizes recognizable. Furthermore, in the following description, a multifunction peripheral is taken as one example of an image forming apparatus.

First Embodiment

Figure 1:
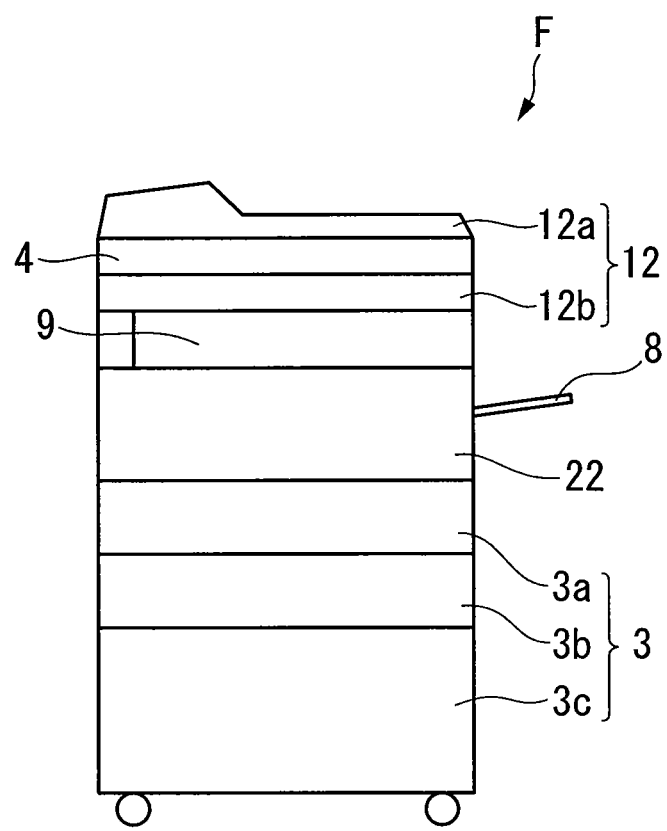
FIG. 1 is a schematic diagram showing a construction of a multifunction peripheral according to a first embodiment of the present invention.
Figure 2:
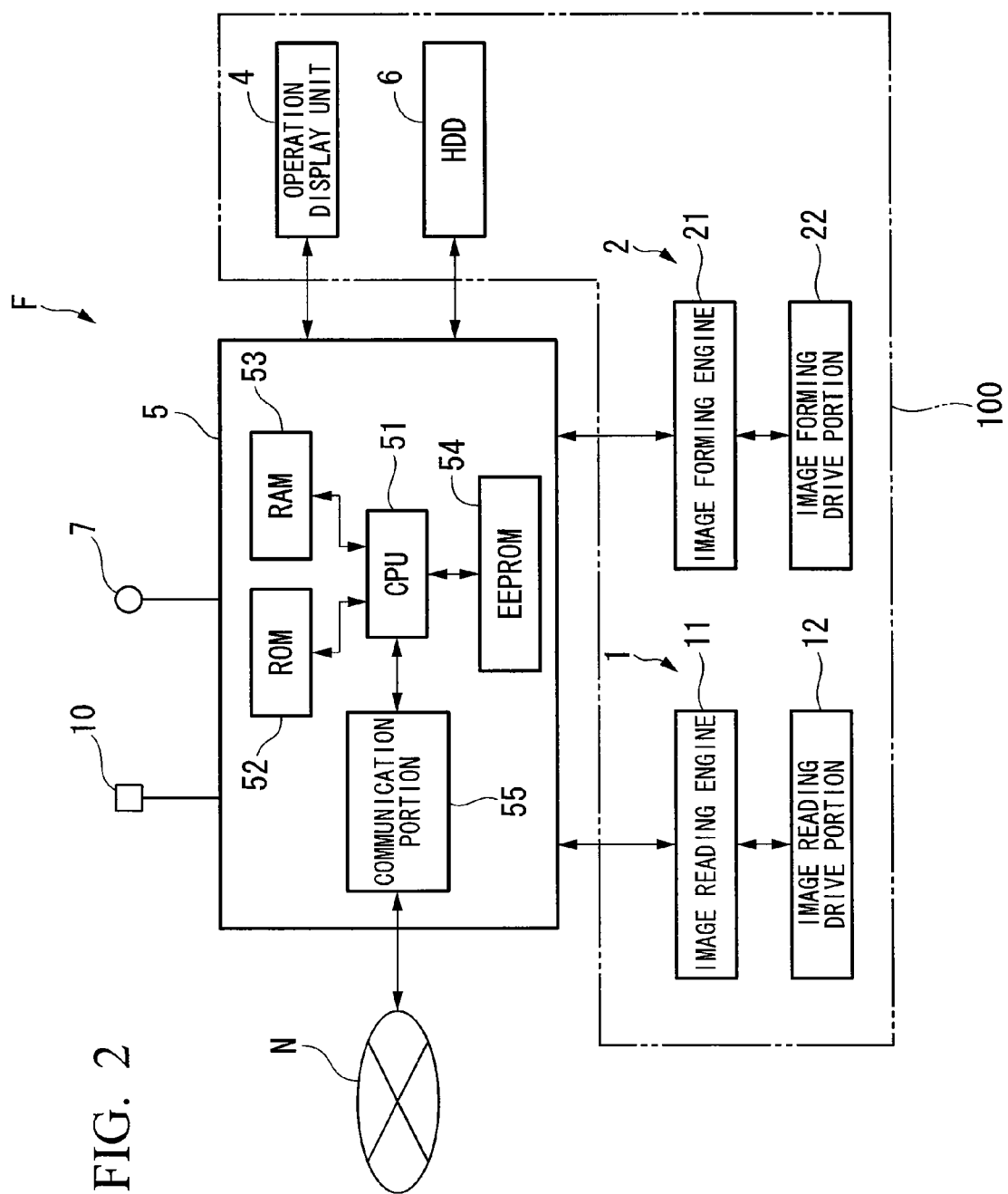
FIG. 2 is a system block diagram of the multifunction peripheral according to the embodiment.

FIG. 1 is a schematic diagram showing a rough construction of a multifunction peripheral of the present embodiment. FIG. 2 is a system block diagram of the multifunction peripheral of the present embodiment.

As shown in these figures, a multifunction peripheral F of the present embodiment includes: an image reading unit 1; an image forming unit 2; a cassette 3 (3a to 3c); an operation display unit 4; a control unit 5; a hard disk drive (HDD) 6; a power key 7; and a switch 10 (a detection sensor).

In the image reading unit 1, an image formed on a document is read as image data. The image reading unit 1 includes: an image reading engine 11 that controls the whole image reading unit 1 under the control of the control unit 5; and an image reading drive portion 12 that reads an image formed on a document under the control of the image reading engine 11, as shown in FIG. 2.

As shown in FIG. 1, the image reading drive portion 12 includes: a document feeding apparatus portion 12a; and a scanner 12b.

In the image forming unit 2, printing (image formation) on a printer sheet (a recording medium) is performed based on the image data read by the image reading unit 1, the image data that is input via a network N shown in FIG. 2, or the like. The image forming unit 2 includes: an image forming engine 21 that controls the whole image forming unit 2 under the control of the control unit 5; an image forming drive portion 22 that performs printing on a printer sheet under the control of the image forming engine 21, as shown in FIG. 2.

The image forming drive portion 22 includes: a photosensitive drum on which is formed an electrostatic latent image based on a printed image; a developing apparatus that supplies toner to the photosensitive drum to develop the electrostatic latent image as a toner image; and a fixing apparatus that fixes the toner image onto a printer sheet.

Furthermore, as shown in FIG. 1, to the image forming drive portion 22, a manual feed tray 8 is connected for enabling manual feed of printer sheets.

The printer sheet printed by the image forming drive portion 22 is discharged to a discharge portion 9 that is installed above the image forming drive portion 22.

Different types of printer sheets to be fed to the image forming unit 2 are held in the cassette 3 (opening/closing members) on a type-by-type basis. The cassette 3 is arranged below the image forming drive portion 22 as shown in FIG. 1.

In the present embodiment, the cassette 3 is made of cassettes 3a to 3c each of which holds a different type of printer sheets.

Figure 3:
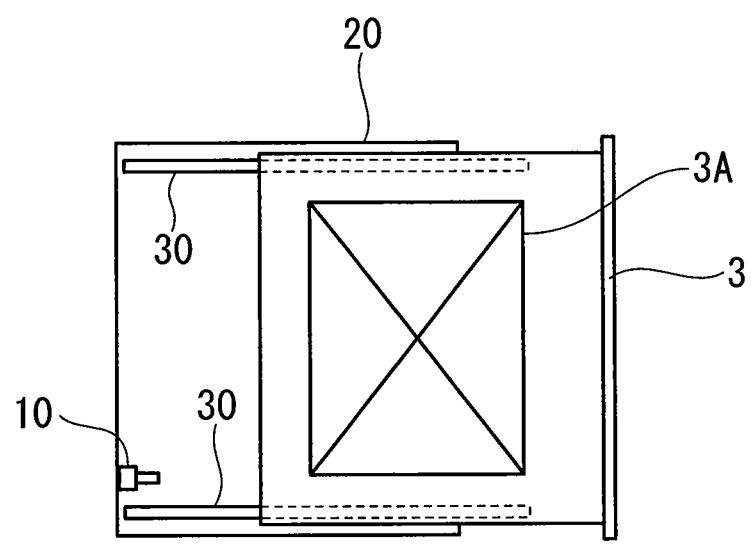
FIG. 3 is a plan view schematically showing the vicinity of a cassette provided in the multifunction peripheral according to the embodiment.

FIG. 3 is a plan view schematically showing the cassette 3. As shown in this figure, the cassette 3 is supported by sliders 30 installed in a casing 20 of the multifunction peripheral F so as to be slidable in the horizontal direction. With the cassette 3 drawn out (that is, opened) by the user, an internal holder portion 3A (an internal mechanism) for printer sheets is exposed. It is possible to restock printer sheets in the holder portion 3A.

The switch 10 detects the opening/closing of the cassette 3. As shown in FIG. 3, the switch 10 is arranged inside the casing so as to be pressed by the cassette 3 when the cassette 3 is closed, and so as to protrude when the cassette 3 is opened.

The switch 10 is electrically connected to the control unit 5. It outputs a signal indicating an open/closed state of the cassette 3 to the control unit 5.

The switch 10 is installed in each of the cassettes 3a to 3c. This enables detection of the open/closed state of each of the cassettes 3a to 3c.

The operation display unit 4 is a man-machine interface arranged so as to be exposed on the surface of the multifunction peripheral F. The operation display unit 4 includes: a touch screen that displays software keys and information to be provided for the user; and hardware keys for the user to input instructions.

The control unit 5 controls the whole multifunction peripheral F of the present embodiment. The control unit 5 is electrically connected to the image reading unit 1, the image forming unit 2, the operation display unit 4, the HDD 6, the power key 7, and the switch 10, as shown in FIG. 2. In addition, the control unit 5 is connected to the network N. Thereby, it is electrically connected to terminals of plural users via the network N.

The control unit 5 includes: a CPU (Central Processing Unit) 51; a ROM (Read Only Memory) 52; a RAM (Random Access Memory) 53; an EEPROM (Electrically Erasable and Programmable Read Only Memory) 54; and a communication portion 55.

The CPU 51 mainly controls the whole control unit 5 and consequently the whole multifunction peripheral F. In the present embodiment, the CPU 51 performs toggling from the energy conservation mode to the image formation mode when the cassette 3 is closed from an open state in energy conservation mode.

Note that energy conservation mode is a mode for reducing power consumption. In this energy conservation mode, only the control unit 5 is energized, and the image reading unit 1, the image forming unit 2, the operation display unit 4, and the HDD 6 are not energized. Image formation mode is a mode that allows printing on printer sheets. In this image formation mode, the control unit 5, the image reading unit 1, the image forming unit 2, the operation display unit 4, and the HDD 6 are energized.

The ROM 52 stores the programs and various pieces of data in advance that the CPU 51 uses when controlling the multifunction peripheral F. The ROM 52 stores, for example, a program for executing energy conservation mode, a program for executing image formation mode, and the like, in advance.

The RAM 53 temporarily stores data required when the CPU 51 executes various programs, and in the present embodiment, stores a part of data stored in the HDD 6 under the control of the CPU 51.

The EEPROM 54 temporarily stores important data, the deletion of which is not admissible, for example, in image formation mode.

The communication portion 55 is directly connected to the external network N. The communication portion 55 receives external data and transmits internal data under the control of the CPU 51.

The HDD 6 stores data with large capacity. The HDD 6 stores, for example, data that shows a remaining amount of printer sheets in each of the cassettes 3, data that shows the type of printer sheets held in each of the cassettes 3, and the like.

The power key 7 is a switch for toggling between the energy conservation mode and the image formation mode through operation by the user. The power key 7 is arranged in the vicinity of the operation display unit 4.

In the present embodiment, of the image reading unit 1, the image forming unit 2, the operation display unit 4, the control unit 5, and the HDD 6, only the control unit 5 is energized, and the image reading unit 1, the image forming unit 2, the operation display unit 4, and the HDD 6 are not energized in energy conservation mode, as described above. As a result, it is possible to reduce an amount of power consumption.

That is, in the multifunction peripheral F of the present embodiment, the control unit 5 is a constantly-energized portion in the present invention. On the other hand, the image reading unit 1, the image forming unit 2, the operation display unit 4, and the HDD 6 constitute a non-constantly-energized portion 100 in the present invention (see FIG. 2).

Next is a description of an operation of the multifunction peripheral of the present embodiment thus constructed. The printing operation of the multifunction peripheral according to the present embodiment is similar to that of conventional multifunction peripherals. Therefore, in the following description, an operation when energy conservation mode is toggled to image formation mode, which is a characteristic operation of the multifunction peripheral according to the present embodiment, will be mainly described.

Figure 4:
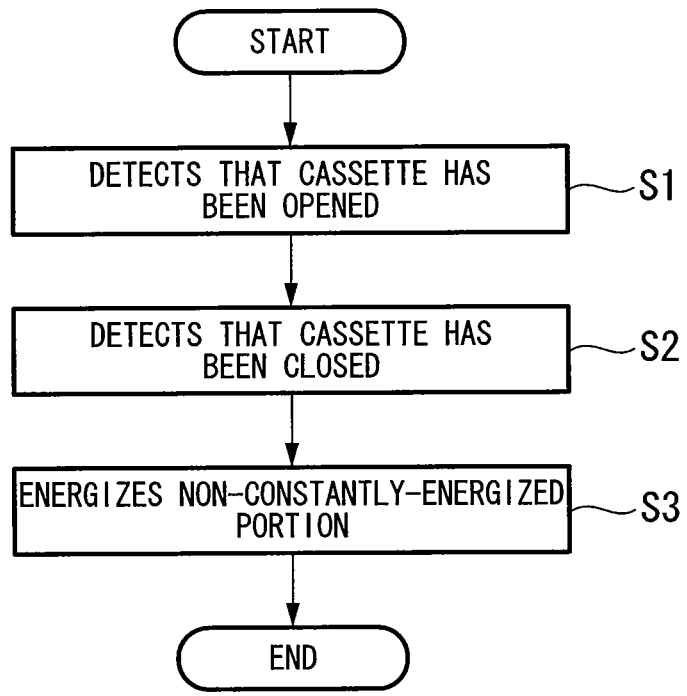
FIG. 4 is a flow chart for explaining an operation of the multifunction peripheral according to the embodiment when energy conservation mode is toggled to image formation mode.

The description of the operation when energy conservation mode is toggled to image formation mode is given with reference to the flow chart of FIG. 4.

When the user opens the cassette 3, the switch 10 is shifted from a pressed state to a protruded state. As a result, a signal indicating that the cassette 3 has been opened is output from the switch 10 to the control unit 5. Thus, the CPU 51 detects that the cassette 3 has been opened (step S1).

Subsequently, when the user closes the cassette 3, the switch 10 is shifted from the protruded state to the pressed state. As a result, a signal indicating that the cassette 3 has been closed is output from the switch 10 to the control unit 5. Thus, the CPU 51 detects that the cassette 3 has been closed (step S2).

With the above-mentioned step S1 and step S2, the CPU 51 detects that the cassette 3 has been closed from the opened state. After that, the CPU 51 starts energizing the image reading unit 1, the image forming unit 2, the operation display unit 4, and the HDD 6 (the non-constantly-energized portion 100) (step S3). As a result, the multifunction peripheral F is toggled from the energy conservation mode to the image formation mode.

In this manner, according to the multifunction peripheral F of the present embodiment, the energy conservation mode is toggled to image formation mode when the cassette 3 is closed from an opened state.

As a result, it is possible to reduce the time in image formation mode more than the case of image forming apparatuses where energy conservation mode is toggled to image formation mode when the cassette 3 is opened.

Therefore, according to the multifunction peripheral F of the present embodiment, it is possible to further reduce power consumption in the multifunction peripheral.

Second Embodiment

Next is a description of a second embodiment of the present invention. In the description of the second embodiment, like constituent parts to those of the above first embodiment are not repetitiously explained or are explained in a simplified manner.

Figure 5:
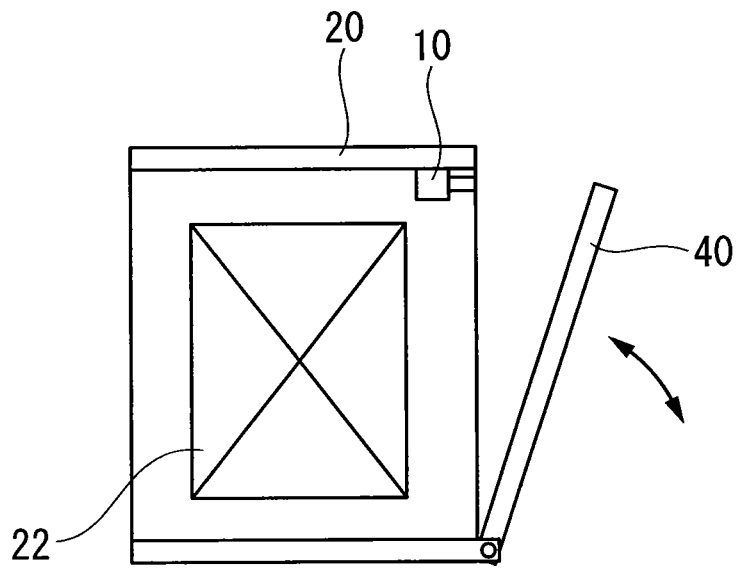
FIG. 5 is a plan view schematically showing the vicinity of a cover member provided in a multifunction peripheral according to a second embodiment of the present invention.

In a multifunction peripheral of the present embodiment, a switch 10, which is provided in the multifunction peripheral F of the above first embodiment, is arranged so as to detect the opening/closing of a cover member 40 (an opening/closing member) provided in a casing 20 for exposing an image forming drive portion 22 (an internal mechanism), as shown in FIG. 5.

The cover member 40 is provided especially for taking a toner container (something for holding toner used for printing printer sheets) out of the casing into the outside, the toner container being provided in the image forming drive portion 22.

According to the multifunction peripheral of the present embodiment with such a construction, when the cover member 40 is closed from an opened state, energy conservation mode is toggled to image formation mode.

As a result, it is possible to reduce the time in image formation mode more than the case of toggling from energy conservation mode to image formation mode when the cover member 40 is opened.

Therefore, according to the multifunction peripheral F of the present embodiment, it is possible to further reduce power consumption in the multifunction peripheral.

Note that the image forming drive portion 22 has its drive halted for the sake of safety when the cover member 40 is opened. The image forming drive portion 22 has its drive started at the same time when the cover member 40 is closed to toggle from energy conservation mode to image formation mode.

While exemplary embodiments of the invention have been described in detail above with reference to the drawings, specific constructions are not limited to the above embodiments. Various design modifications and the like can be made without departing from the spirit or scope of the invention.

For example, in the above embodiments, a multifunction peripheral has been described as one example of image forming apparatus of the present invention.

However, the present invention is not limited to multifunction peripherals, and is also applicable to image forming apparatuses such as copiers, printers, and facsimile apparatuses.

Furthermore, in the above embodiments, the description has been for the construction where the opening/closing member of the present invention is the cassette 3 or the cover member 40.

However, the present invention is not limited to this. It is possible to use an opening/closing member as an opening/closing member of the present invention so long as it is capable of exposing an internal mechanism of the multifunction peripheral.

For example, a cover member of a discharge mechanism that is opened/closed in fixing a paper jam, or a finisher attachable/detachable to/from the main unit may be used as an opening/closing member of the present invention.

Furthermore, in the above first embodiment, the description has been for the construction where the switch 10 detects the opening/closing of the cassette 3. In the above second embodiment, the description has been for the construction where the switch 10 detects the opening/closing of the cover member 40.

However, for example, both the switch 10 that detects the opening/closing of the cassette 3 and the switch 10 that detects the opening/closing of the cover member 40 may be provided.

Furthermore, in the above embodiments, the description has been for the construction where the switch 10 is used as a detection sensor of the present invention.

However, the present invention is not limited to this. Another sensor may be installed instead of the switch 10.

From the above embodiments, the present invention is summarized as the following. That is, an image forming apparatus according to one embodiment of the present invention is an image forming apparatus capable of toggling between image formation mode and energy conservation mode, the image formation mode allowing image formation on a recording medium, and the energy conservation mode having power consumption lower than that of the image formation mode, the image forming apparatus including: a constantly-energized portion that is energized both in the image formation mode and the energy conservation mode; a non-constantly-energized portion that is energized only in the image formation mode; and an opening/closing member capable of exposing an internal mechanism held inside a casing of the image forming apparatus, in which the image forming apparatus toggles from the energy conservation mode to image formation mode when the opening/closing member is closed from an opened state in the energy conservation mode.

It may be arranged such that the image forming apparatus further includes a detection sensor that detects opening/closing of the opening/closing member, in which the constantly-energized portion detects that the opening/closing member has been closed from an opened state based on a detection result of the detection sensor.

It may be arranged such that the opening/closing member is a cassette that holds the recording medium.

Furthermore, it may be arranged such that the opening/closing member is a cover member that is opened/closed when a toner container is put in/taken out, the toner container holding toner used for image formation on the recording medium.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image forming apparatus capable of toggling between image formation mode and energy conservation mode, the image formation mode allowing image formation on a recording medium, and the energy conservation mode having power consumption lower than that of the image formation mode, the image forming apparatus comprising:
   a constantly-energized portion that is energized both in the image formation mode and the energy conservation mode including a control unit, the control unit including a central processing unit;
   a non-constantly-energized portion that is energized only in the image formation mode;
   a plurality of cassettes holding the recording medium, all of the plurality of cassettes being held inside a casing of the image forming apparatus, the plurality of cassettes being configured to be withdrawn from an inserted position in which all of the plurality of cassettes are held inside the casing of the image forming apparatus to add the recording medium to the plurality of cassettes, the withdrawal of the plurality of cassettes from the inserted position being completed without detaching the plurality of cassettes from the casing;
   a power key for toggling between the energy conservation mode and the image formation mode by operation of the power key by a user; and
   a plurality of detection sensors electrically connected to the control unit, each detection sensor detecting withdrawal of a respective cassette from the inserted position and insertion of the respective cassette to the inserted position and that is arranged inside the casing so as to be pressed in by a portion of a front surface of the respective cassette when the respective cassette is inserted to the inserted position and so as to protrude when the respective cassette is withdrawn from the inserted position, the portion of the front surface of the respective cassette not protruding from the remainder of the front surface of the respective cassette, the front surface of the respective cassette defining a thickness of the respective cassette between a top surface of the respective cassette and a bottom surface of the respective cassette, each detection sensor sending a first signal to the control unit indicating withdrawal of the respective cassette from the inserted position when each detection sensor moves from a pressed in state to a protruded state, and each detection sensor sending a second signal to the control unit indicating insertion of the respective cassette to the inserted position when each detection sensor moves from a protruded state to a pressed in state, wherein
   the central processing unit causes the image forming apparatus to automatically toggle from the energy conservation mode to the image formation mode when an insertion of the plurality of cassettes to the inserted position is detected in the energy conservation mode by the constantly-energized portion, based on detection results of the plurality of detection sensors, after a withdrawal of the plurality of cassettes from the inserted position is detected in the energy conservation mode by the constantly-energized portion, based on detection results of the plurality of detection sensors, rather than when only a withdrawal of the plurality of cassettes from the inserted position is detected in the energy conservation mode by the constantly-energized portion, based on detection results of the plurality of detection sensors, the image forming apparatus being in the energy conservation mode during the entire time between the withdrawal of the plurality of cassettes from the inserted position and the insertion of the plurality of cassettes to the inserted position.

2. The image forming apparatus of claim 1, wherein each of the detection sensors is configured to prevent further movement of the respective cassette into the casing beyond the inserted position by a pressed in state of the respective detection sensor resulting from the pressing in of the respective detection sensor by the respective cassette, the respective detection sensor in the pressed in state having a shorter length than a length of the respective detection sensor in the protruded state.

* * * * *